United States Patent [19]

Eilenberger et al.

[11] Patent Number: 4,922,487
[45] Date of Patent: May 1, 1990

[54] PACKET-SWITCHING FACILITIES

[75] Inventors: Gert Eilenberger, Kirchheim; Karl Schrodi, Heimsheim; Stefan Wahl, Hemmingen, all of Fed. Rep. of Germany

[73] Assignee: Alcatel N.V., Amsterdam, Netherlands

[21] Appl. No.: 286,305

[22] Filed: Dec. 16, 1988

[30] Foreign Application Priority Data

Dec. 18, 1987 [DE] Fed. Rep. of Germany ....... 3742941

[51] Int. Cl.$^5$ ..................... H04L 11/20; H04Q 11/04
[52] U.S. Cl. .................................................. 370/60
[58] Field of Search ................. 370/60, 85, 94, 60.1, 370/94.1, 94.2

[56] References Cited

U.S. PATENT DOCUMENTS

| | | | |
|---|---|---|---|
| 4,679,190 | 7/1987 | Dias et al. | 370/60 |
| 4,698,802 | 10/1987 | Goke et al. | 370/60 |
| 4,785,446 | 11/1988 | Dias et al. | 370/60 |

FOREIGN PATENT DOCUMENTS 2139852 11/1984 United Kingdom .

OTHER PUBLICATIONS

Thomas et al, *Asynchronous Time-Division Techniques: An Experimental Packet Network Integrating Videocommunication*, ISS '84 Florence, 7-11 May 1984.
W. Schmidt "Die Vermittlungstechnik in integrieten Paket-Ubermittlungs 'system' Parts 1 and 2;", Der Fermelde-Ingenerur; Sep./Oct. 87, Sect. 3.4, FIG.4, p. 9.

*Primary Examiner*—Douglas W. Olms
*Assistant Examiner*—Melvin Marcelo
*Attorney, Agent, or Firm*—Christie, Parker & Hale

[57] ABSTRACT

Fixed numbers of packets are combined into frames within the switching facility, and all packets are divided into subpackets of equal length and distributed to subframes. Switching takes place on the basis of subframes using synchronous time-division multiplexing. The amount of storage space needed in the switching network is reduced in the ratio of frames:subframes. The buffers are those which are necessary for synchronous TDM switching anyhow.

4 Claims, 3 Drawing Sheets

PACKET-SWITCHING FACILITIES

TECHNICAL FIELD

The present invention relates to a packet-switching facility, an input unit therefor and an output unit therefor.

CROSS REFERENCE TO RELATED APPLICATIONS

Other applications of the concepts underlying the present invention are disclosed in the commonly assigned U.S. patent application of inventor H. Weik (Case No. 1) entitled "METHOD AND FACILITIES FOR HYBRID PACKET SWITCHING" filed concurrently herewith under docket number 20352/JMM. To the extent such copending application may contain any additional information that might be of any assistance in the use and understanding of the invention claimed herein, it is hereby incorporated by reference.

CLAIM FOR PRIORITY

This application is based on and claims priority from an application first filed in Fed. Rep. Germany on 12/18/87 under Ser. No. P37 42 941.8. To the extent such prior application may contain any additional information that might be of any assistance in the use and understanding of the invention claimed herein, it is hereby incorporated by reference.

BACKGROUND ART

Packet-switching facilities of this kind are known, e.g., from A. Thomas, J. P. Coudreuse, M. Servel, "Asynchronous Time-Division Techniques: An Experimental Packet Network Integrating Videocommunication", ISS '84 Florence, 7-11 May 1984, Session 32C, Paper 2, pages 1-7 (ISS=International Switching Symposium).

Messages of random volume are preferably transmitted in the form of packets of equal length over virtual circuits. At present it is assumed that messages of deterministic volume will be transmitted in the same manner and together with the other messages.

In a packet-switching facility it may happen that two or more packets intended to be forwarded on the same line arrive simultaneously on different lines.

Therefore, buffers must be provided in which the packets that cannot be forwarded immediately can wait. The amount of storage needed for this purpose, besides depending on the length of the packets, depends particularly on the number of incoming lines, the type of traffic, and the required transmission quality. In prior-art packet-switching facilities, about 80% of the area of all chips in the switching network are used for these buffers. From "Der Fernmelde=Ingenieur", Vol. 41, No. 9, September 1984, especially item 3.4 on pages 8 and 9, and No. 10, October 1987, packet-switching systems are known in which information is transmitted in the form of frames containing fixed numbers of packets. European Patent Publication No. EP-A2-0 125 744 "Closed Loop Telecommunication System" describes a ring system in which a complete frame containing a plurality of packets circulates at all times, using shift registers or other memories.

DISCLOSURE OF INVENTION

The object of the present invention is to provide a packet-switching facility of comparable traffic capacity which requires clearly less storage space.

The division of the packets into subpackets yields effectively shorter "packets", which result in a corresponding reduction of memory requirements. However, since only the first subpackets contain path information the interrelationship and, thus, the equal treatment of subpackets belonging together must be ensured in a different manner. Instead of being inserted into the data stream at a random point as is usual with packets, the individual subpackets follow one another according to a predetermined pattern, preferably at equal intervals. In order that the effective shortening of the packets can produce the desired effect, subpackets belonging together must not follow one another directly but must alternate with subpackets of other packets.

Preferably, fixed numbers of packets are thus combined within the switching facility into frames, and all packets are divided into subpackets of equal length and distributed to subframes. Switching takes place on the basis of subframes using synchronous time-division multiplexing. The storage space required in the switching network is reduced in the ratio of frames:subframes. The memories used are primarily those which are necessary for synchronous TDM switching anyhow. Additional storage capability can be provided by inserting additional empty packets at the inputs and increasing the clock rate within the switching facility. Such an externally predetermined frame structure is advantageously adopted within the switching facility. Without taking any additional steps, circuit switching with its inherent advantages (no delay jitter and no losses) is then provided for messages whose packets recur periodically within the frames.

Since, for most messages, the individual packets do not occur in a fixed sequence, an asynchronous transfer mode (ATM) is obtained. The individual packets are referred to as "ATM cells". For messages whose packets recur periodically, a synchronous transfer mode (STM) is obtained. The individual packets are referred to as "STM cells". In connection with the synchronous transfer mode, terms such as "circuit switching" (CS) and "CS packets" are used; in connection with the asynchronous transfer mode, terms such as "packet switching" (PS), "PS packets", "asynchronous time division" (ATD), and "fast packet switching" are used. Combinations are called "hybrids".

While the invention will be described using terms which are applied primarily to centrally located switching facilities—the following embodiment represents a central switching facility, too—it is equally applicable to decentralized switching systems, such as ring systems. Reference is made to the above-mentioned article from "Der Fernmelde=Ingenieur", where bus and ring systems under 4.1.2 are subordinated to the switching arrangements under 4, and to the publication EP-No. A2-0 125 744, "Closed loop telecommunication system", which describes a ring system in which a complete frame containing a plurality of packets circulates at all times, which requires shift registers or other memories.

BRIEF DESCRIPTION OF DRAWINGS

An embodiment of the invention will now be explained with reference to the accompanying drawings, in which.

BEST MODE FOR CARRYING OUT THE INVENTION

Figure 1:
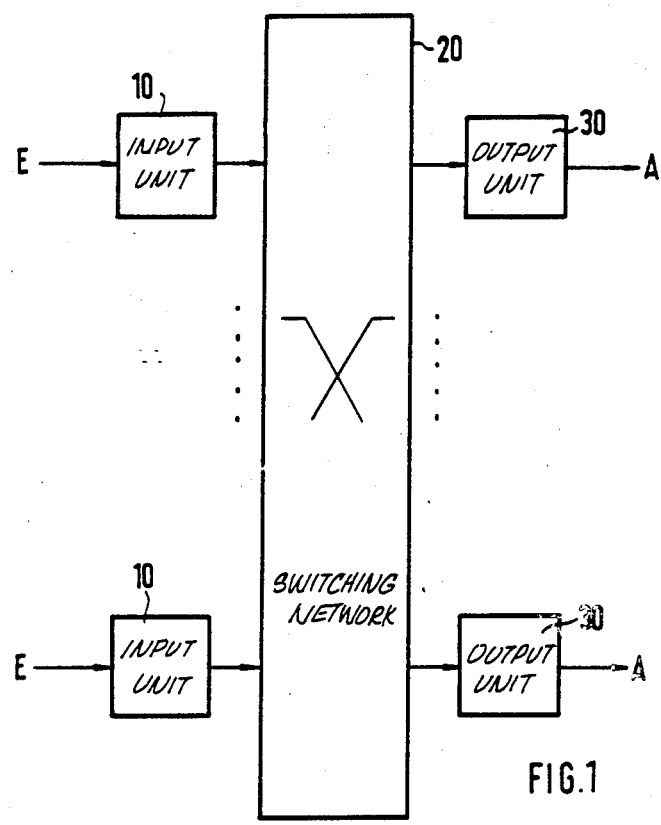
FIG. 1 is a coarse block diagram of a switching facility according to the invention.

As shown in FIG. 1, the switching facility according to the invention, like any other switching facility, has a plurality of inputs E, a plurality of outputs A, and a switching network 20. According to the invention, an input unit 10 is interposed between each input E and the switching network 20, and an output unit 30 between the switching network 20 and each output A.

Figure 2:
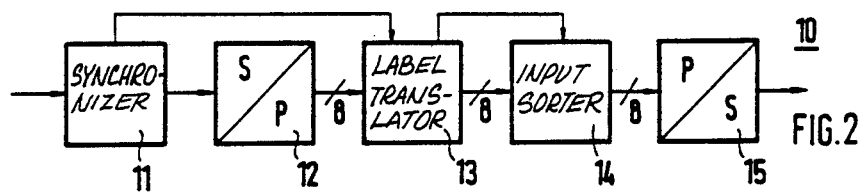
FIG. 2 is a block diagram of an input unit for the switching facility of FIG. 1.

FIG. 2 shows the input unit 10 of FIG. 1 in greater detail. It consists of a synchronizer 11, a serial-parallel converter 12, a label translator 13, an input sorter 14, and a parallel-serial converter 15.

The synchronizer 11 recognizes the clock contained in the input data stream, particularly the bit clock, and the beginnings of the incoming packets. If the external data stream already contains a frame clock, the frame structure can be adopted. Otherwise, fixed numbers of packets, e.g., 70, are combined into frames. If an external frame clock is present, the internal frame clock may differ therefrom. Then, however, a synchronous transfer mode for individual messages is not always guaranteed.

The serial-parallel converter 12 converts the data stream octet by octet, i.e., in groups of 8 bits, into a parallel data stream. The necessary synchronization by the synchronizer 11 is not shown in FIG. 2.

The label translator 13 changes the format of the individual packets. Each packet consists of an information part ("payload") and a preceding label (header). The label is a piece of information for the next exchange. Therefore, the incoming label is first replaced by an outgoing label. To this outgoing label is added an internal label which contains priority information (e.g., ATM, STM), path information, and information on the internal significance (e.g., control packet, empty packet). Also, at least in the case of ATM packets, a label indicating the end of the packet is added. Because of the added information, the bit clock in the level translator 13 is increased. Therefore, phase variations between the internal clock and the external clock can be compensated for in the level translator. It is also readily possible to increase the packet repetition rate (packet clock) at that point. To do this, empty packets are added which act within the switching network 20 like additional buffers.

The input sorter 14 receives from the level translator 13, on the one hand, the packets in the internal format and, on the other hand, the packet clock and clocks derived therefrom (octet clock, bit clock). Each packet is divided into a predetermined number of subpackets of equal length. The subpackets of the different packets are so re-sorted as to form subframes containing a subpacket of each packet, with the subpackets belonging together spaced at equal intervals. For example, if 70 packets each containing 40 octets are combined into a frame, and each octet forms one subpacket, 70 octets will form one subframe after the re-sorting process, with each octet belonging to a different packet. For each packet, like for the circuit-switched call, the first subpacket then causes a path to be set up through the switching network 20, on which the other subpackets then follow. The connection is released by the last subpacket of a packet. If one subpacket is not sufficient for the path information through the entire switching network, the connection must be set up stage by stage.

To set up a virtual circuit, the path to be taken by the subsequently incoming packets is marked out in a connection setup phase in the conventional manner. This is done, for example, by setting up tables at the beginning or end of a link, e.g., in label translators, by which each incoming label can be assigned an outgoing label. In this manner, the concrete physical path is determined, but not the instant of the transfer. In a packet-switching facility according to the invention, a particular time slot is determined for the individual subpackets of each packet within the predetermined path.

If STM connections are to be set up, a fixed tine slot can be reserved for them on the predetermined path. This reservation can be effected by not adding an end-of-packet label to the last subpacket.

The parallel-serial converter 15 following the input sorter 14 converts the individual octets back into a serial packet stream.

Figure 3:
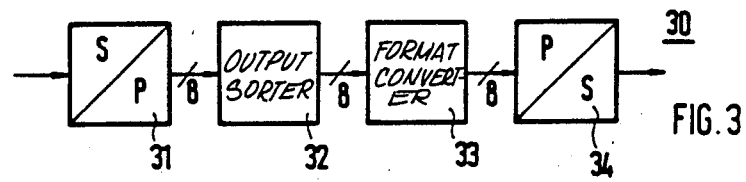
FIG. 3 is a block diagram of an output unit for the switching facility of FIG. 1.

The output units 30 correspond in structure to the input units, as shown in FIG. 3. They each consist of a serial-parallel converter 31, an output sorter 32, a packet-format converter 33, and a parallel-serial converter 34.

The output sorter 32 re-sorts the subpackets in such a manner that the subpackets belonging to a packet are recombined.

The packet-format converter 33 removes the internal labels and the end-of-packet labels. If empty packets were inserted at the input units 30, just as many packets must now be removed.

In the simplest conceivable case, all frames and subframes are synchronous in each stage of the switching facility, and the first subframe of a frame contains the beginnings of all packets. With the first subframe occurring simultaneously in the entire switching network 20, the time slots are permanently assigned, on the predetermined paths, to this first subframe and to all subframes belonging to the same frame, this assignment being predetermined for STM connections and free for ATM connections. On the occurrence of the last subframe, all time-slot assignments are cancelled. The simplest way of guaranteeing the same time-slot assignment for all STM connections is not to cancel this assignment at the end of a packet, which can be achieved by not adding the end-of-packet label.

This simple case presumes that all paths through the exchange are of the same length, so that different switching-network structures are not possible. If it is ensured, however, that beginnings and ends of packets are recognizable from the data stream, they need not be additionally recognizable by the time position. The frames then need no longer be synchronous. In an extreme case, a separate frame can be formed for each packet arriving at one of the inputs E.

It is preferred to form a frame and subframe structure for each input E and, thus, for each input unit 10, but not to synchronize the input units 10 with one another.

For this case, a preferred embodiment of the input sorter 14 will now be described with the aid of FIG. 4.

This input sorter 14 uses a frame memory 141 which does not require more locations than are needed for exactly one frame and by which re-sorting is nevertheless effected within the frame in the necessary manner.

The input sorter 14 consists essentially of the frame memory 141 and an addressing unit which contains a full adder 142, a register 143, a read-only memory 144, a counter 145, a six-input AND gate 146, a memory 147, and additional gates 148a, 148b, 148c, and 149.

The addressing unit changes the serial stream of packets into the synchronous TDM subframes containing subpackets. Every n packets form a frame. The frame memory 141 contains $n \times m$ words, one for each subpacket, where m is the number of subpackets per packet. The frame memory 141 is consecutively numbered from 0 to $(n \times m - 1)$. Each TDM subframe contains a subpacket of each packet of a frame. The order of the subpackets in the subframe is equal to the order of the packets in the frame. The first subframe thus contains the first subpackets of all packets, the second subframe the second subpackets of all packets, etc. The subpackets are read from the frame memory 141 one at a time, and immediately thereafter a new subpacket is written into the vacated location.

Since the subpackets are written into the frame memory 141 in an order different from that of the readout, they are scrambled in the frame memory. This scrambling is cyclical and can be described by a mathematical function which is implemented with the addressing unit. Within each frame, the addresses of the frame memory 141 must be traversed with a different step value $S_k$, which is given by $$S_k = (m \times S_{k-1}) \text{ modulo } (n \times m - 1)$$

and $$S_1 \times 1.$$

If the step value $S_k$ is different from 1, the frame memory must be traversed $S_k$ times until all locations were addressed once. When the address range is exceeded, the address must be decremented by $n \times m - 1$, which is done by adding the two's complement of $n \times m - 1$. Only after the $S_k$th cycle is the end of the frame memory 141 reached. Then one frame has been completely read out and the next has been completely written in. With the next step value, one frame is read out again, and one frame written in.

Figure 4:
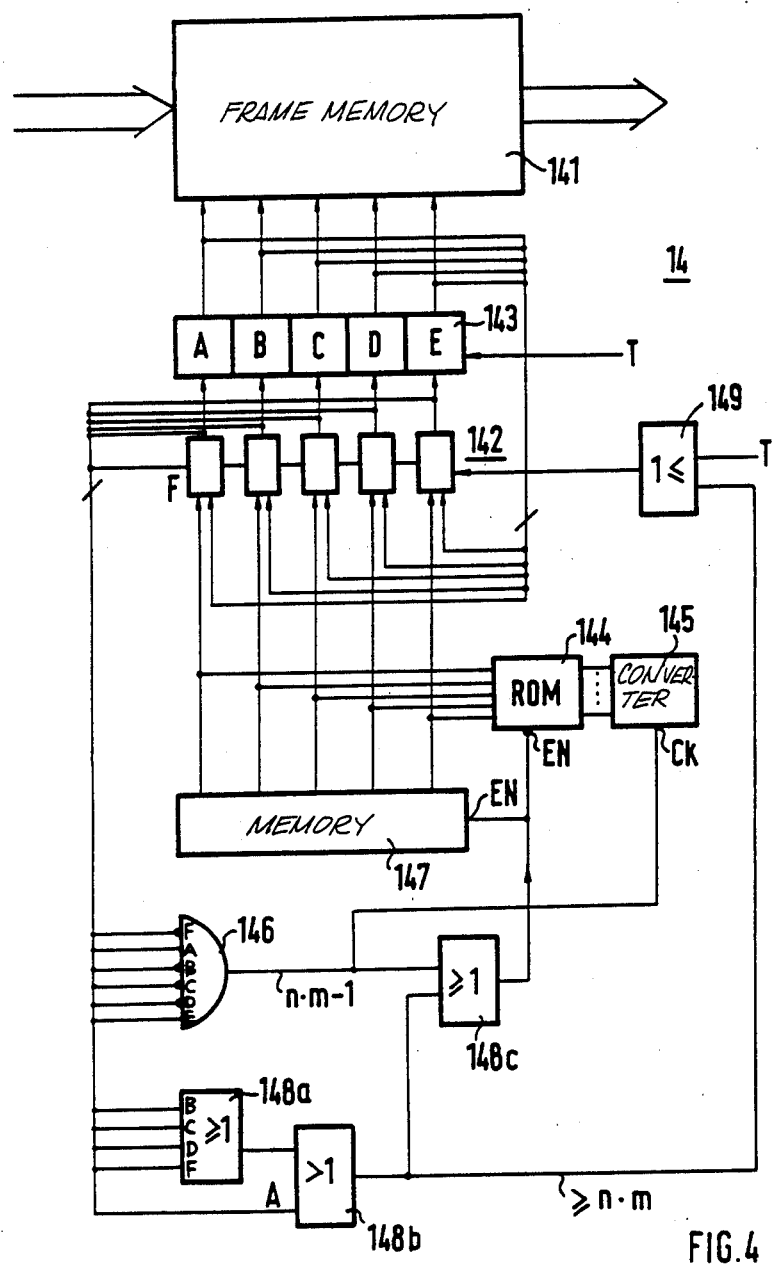
FIG. 4 is a detailed block diagram of an input sorter for the input unit of FIG. 2.

FIG. 4 shows one way of implementing the input sorter for the example n=6 and m=3. In the frame memory 141, the locations 0 to 17 must thus be addressed. At the address 17, a frame has been completed, and it is necessary to change to the next frame and, thus, to the next step value. If the address 17 is exceeded, the frame memory 141 must be traversed again with the same step value; to this end, the address must first be reduced by 17 in order to get back into the address range.

The respective address is contained in the register 143. It consists of five bits A . . . E, with A representing the most significant bit and E the least significant bit. The full adder 142 adds the current step values specified by the read-only memory 144 to the contents of the register 143. The result of the addition is transferred as a new address into the register 143. The transfer into the register is initiated by a clock T, which also causes the full adder, via an OR gate 149, to perform an addition. The full adder 142 produces a carry F.

The six-input AND gate 146 senses the count $n \times m - 1 = 17$ at A=E=1 and B=C=D=F=0. The counter 145 is then incremented via its clock input Ck. The count of the counter 145 is used to address the read-only memory 144, so that the respective next step value is now added to the contents of the register 143. The step values are determined with the aid of the formula for $S_k$ and then stored in the read-only memory 144. At the sum $n \times m - 1 = 17$, the outputs of the read-only memory 144 are disabled via an OR gate 148c and a disable input EN of the read-only memory, and the outputs of the memory 147 are enabled via the OR gate 148c and an enable input EN of this memory. During the next addition initiated by the clock T, the two's complement of 17 contained in the memory 147 is therefore added to the contents of the register 143, so that the latter is in the zero state again.

When the address $n \times m - 1 = 17$ is exceeded, the sum must be reduced by $n \times m - 1 = 17$, but the step value and, thus, the count of the counter 145 must be retained. A sum $\geq n \times m$ is sensed by an OR gate 148a and an AND gate 148b. That is the case if B+C+D+F (OR gate 148a) and A (AND gate 148b) are simultaneously 1. In that case, the states of the disable input EN of the read-only memory 144 and the enable input EN of the memory 147 are changed again via the OR gate 148c, so that instead of the step value, the two's complement is presented as an addend to the full adder 142. Moreover, an addition independent of the clock T is initiated in the full adder 142 via the OR gate 149.

If frame alignment exists in each stage of the switching facility, the output sorters 32 in the output units 30 can be of the same construction as the input sorters 14. In calculating the step values, however, n and m must be interchanged, so that $$S_k = (n \times S_{k-1}) \text{ modulo } (n \times m - 1)$$

and $$S_1 = 1.$$

Figure 5:
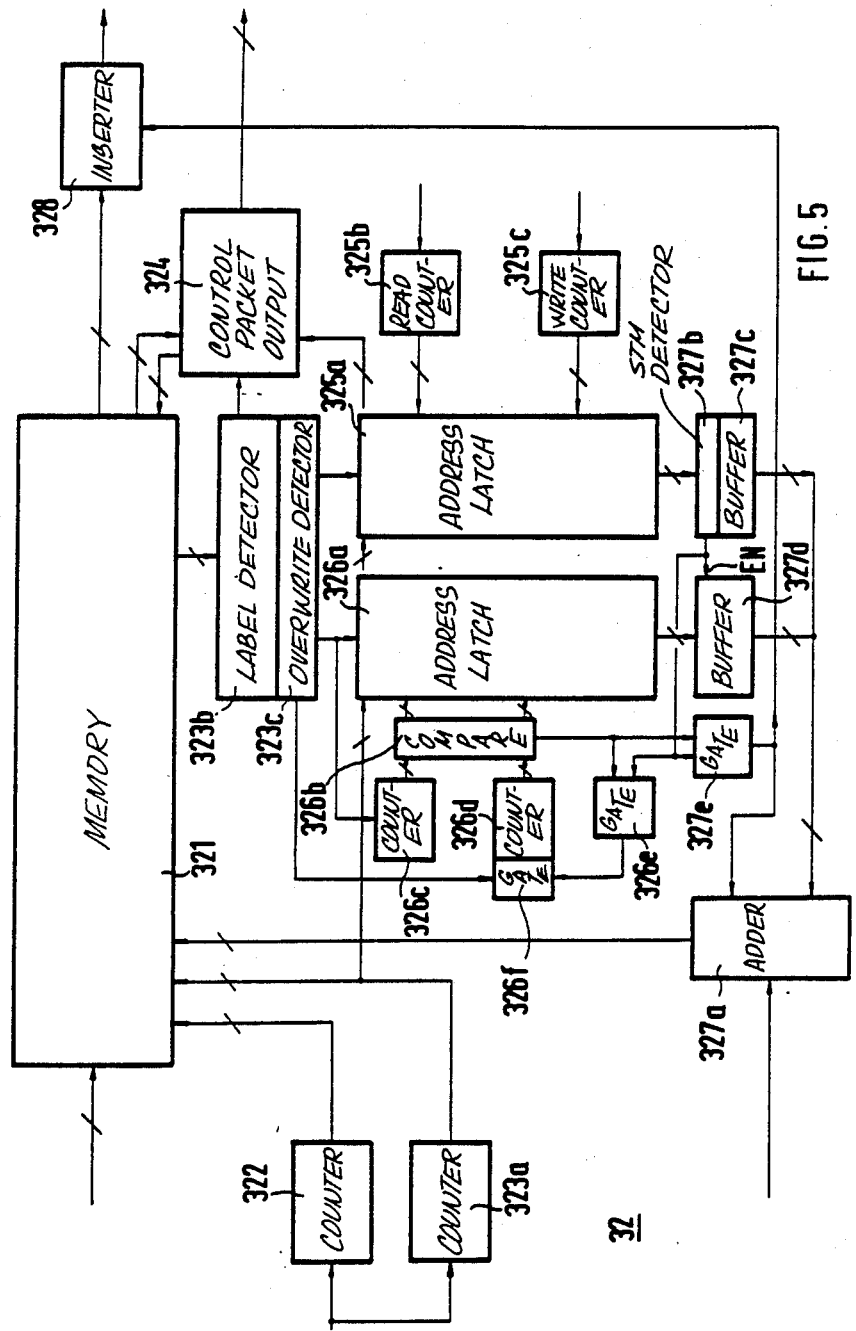
FIG. 5 is a detailed block diagram of an out-port sorter for the output unit of FIG. 3.

If there is no internal frame alignment, the beginnings and ends of the packets must be recognizable from the data stream. A preferred embodiment of the output sorter 32 which is suitable for this purpose will now be described with the aid of FIG. 5. This output sorter 32 includes a memory 321 which needs as many locations as are necessary for two frames (to which empty packets may have been added). This example will be based on an external frame containing 70 40-octet packets. The output sorter 32 consists essentially of the memory 321, a control packet output unit 324, and an addressing unit which contains a cyclic write-in counter 322, a cyclic search counter 323a, a packet-label detector 323b, an overwrite detector 323c, an STM address latch 325a, a readout counter 325b, a write-in counter 325c, an ATM address latch 326a, an address comparator 326b, two counters 326c and 326d, an adder 327a, an STM detector 327b, an empty-packet-inserting unit 328, two buffers 327c and 327d, and several gates 326f, 326e, and 327e.

Control packets delivered by the control packet output unit 324 are fed directly to the control units.

The addressing unit converts the synchronous TDM subframe into the serial packet stream. It also reduces the packet format directly to the information part (payload) and the preceding label, and converts the internal packet clock, i.e., the packet clock of the switching network, to the external packet clock. The STM packets are read from the memory 321 in such a way as to occupy the same position in the frame throughout the duration of the call.

The write-in counter 322 is clocked by the internal subpacket clock and cyclically addresses all locations of the memory 321 into which the subpackets coming from the switching network are written. The search counter 323a is clocked by the same clock as the write-in counter 322 and addresses the locations of the memory 321 with a delay of one frame period relative to the write-in counter 322. The memory 321 delivers the subpacket addressed by the search counter 323a to the packet-label detector 323b. The packet-label detector 323b determines whether the addressed subpacket is the first subpacket of a packet and, if so, whether the packet is an ATM, STM or control packet. The addresses of the search counter 323a are also transferred to the ATM address latch 326a, the STM address latch 325a, and the control packet output unit 324. If the packet-label detector 323b has detected a first subpacket of a packet, it sends a write signal to the appropriate unit (324, 325a, 326a), which then accepts the address from the search counter 323a.

The write-in counter 325c is clocked by the internal subpacket clock and cyclically addresses the STM address latch 325a with the addresses from 0 to 69 (+ additional empty-packet number). If the packet-label detector 323b has detected an STM call, it applies a write signal to the STM address latch 325a, which stores the address from the search counter 323a at the location addressed by the write-in counter 325c. On condition that the last switching-network stage before the output sorter 32 places STM subpackets only into the first 70 octets of the subframe, it can be guaranteed that the packets of an STM call are always in the same place of the frame. This can be thought of as a projection of the STM address entries in the STM address latch 325a onto the packets in the frame.

The readout counter 325b is clocked by the external packet clock and cyclically addresses the STM address latch 325a with the read addresses 0 to 69. The STM address latch contents addressed by the readout counter 325b are transferred to the STM detector 327b and reset to 0 in the STM address latch 325a. The STM detector 327b determines whether the input value is greater than 0. If the value is greater than 0, the STM detector 327b disables the buffer 327d and applies a logic 0 to the AND gate 327e and the OR gate 326e. The buffer 327c accepts the address from the STM detector 327b and passes it to the adder 327a. The adder 327a adds an offset value to the address. As a result, the address at the adder output points to the first subpacket of the label in the memory 321. The adder 327a has the external subpacket clock applied to it and continuously adds the value 70 (+ number of additional dummy packets) at this clock rate. When the adder 327a addresses the last subpacket of a packet, a new address is presented to its input unless this is inhibited by AND gate 327e.

The units 326a to 326f together form a modified FIFO memory. The ATM address latch 326a is addressed by the (write-in counter 326c and the (readout counter 326d. A write signal from the packet-label detector 323b to the ATM address latch 326a causes the address made available by the search counter 323a to be written into the location addressed by the counter 326c. The counter 326c is incremented by the write signal from the packet-label detector 323b and cyclically addresses the (e.g., 2×78) locations of the ATM address latch 326a. The counter 326d is clocked by an OR gate 326f. One input of the OR gate 326f is connected to the over-write detector 323c. The latter determines from the number of STM and ATM write signals of the packet-label detector 323b per frame period any overwriting of an ATM packet still contained in the memory 321 with a new packet. The comparator 326b compares the counts of the counter 326d and the counter 326c, and provides a logic 1 to the OR gate 326e and the AND gate 327e if the counts are the same. The comparator 326b thus indicates whether an ATM packet has been entered into the ATM address latch 326a, and inhibits the incrementing of the read-out counter 326d if the counts are the same. If the ATM address latch 326a is empty, and the STM detector 327b detects no STM packet, this detector applies a logic 1 to the AND gate 327e, so that the output of the latter goes to logic 1. The adder 327a is thus disabled and the empty-packet-inserting unit 328 delivers an empty packet.

We claim:
1. Packet-switching apparatus comprising
   a plurality of inputs for receiving packets,
   a plurality of outputs for transmitting packets,
   a switching network for transferring packets between selected inputs and selected outputs,
   a plurality of input units, each coupled between a respective one of the inputs and the switching network and further comprising
      first means for dividing each packet into a respective plurality of subpackets and
      second means for distributing the associated subpackets together with subpackets of other packets over a period of time longer than that of a single packet according to a predetermined pattern, and
   a plurality of output units, each coupled between the switching network and a respective one of the outputs and further comprising
      third means for recombining each of the respective plurality of subpackets into a respective packet on the basis of the predetermined pattern,
   wherein
   the subpackets are transferred through the switching network separately,
   a plurality of packets are combined by each input unit into a frame,
   all packets are divided by said first means into a plurality of subpackets of equal length,
   the subpackets are re-sorted in time by said second means such that each frame is divided into a plurality of subframes,
   the number of subpackets within a subframe is equal to the number of packets within a frame,
   the subpackets belonging to the same packet occupy the same position within each subframe,
   time-division-multiplex channels through the switching network are determined by the first subpackets of the respective packets, the subpackets following the first subpackets use the thus-determined time-division-multiplex channels, and the subpackets belonging to each packet are recombined by the third means in the respective output unit.

2. Packet-switching apparatus comprising
a plurality of inputs for receiving packets,
a plurality of outputs for transmitting packets,
a switching network for transferring packets between selected inputs and selected outputs,
a plurality of input units, each coupled between a respective one of the inputs and the switching network and further comprising
  first means for dividing each packet into a respective plurality of subpackets.
  second means for distributing the associated subpackets together with subpackets of other packets over a period of time longer than that of a single packet according to a predetermined pattern and
  an input sorter having a memory and an addressing unit, and
a plurality of output units, each coupled between the switching network and a respective one of the outputs and further comprising
  third means for recombining each of the respective plurality of subpackets into a respective packet on the basis of the predetermined pattern,
wherein
under control of the input sorter addressing unit, data is written into and read from the memory in such a manner that each packet is divided into a plurality of subpackets and that said subpackets, together with subpackets of other packets, are distributed over a longer period of time according to a predetermined pattern,
the subpackets are transferred through the switching network separately,
the addressing unit includes a register whose contents are transferred as an offset address to the memory, and
the addressing unit repeats the following sequence of operations:
first a subpacket is read from a location in the memory specified by said offset address,
immediately thereafter, a subpacket is written into said location,
the addressing unit then increases the contents of the register by a predetermined step value $S_k$ and, upon exceeding a predetermined maximum offset, reduces the contents by said predetermined maximum offset, and
when the contents equal said predetermined maximum offset, the register is cleared and the current step value $S_k$ is changed to a new step value $S_{k+1}$ calculated from the current step value $S_k$ according to the recursive relation $$S_{k+1} = (m \times S_k) \text{ modulo } (n \times m - 1)$$

where
$S_1 = 1$
n = ratio of the period over which the subpackets of a packet are distributed to the duration of a packet
m = number of subpackets per packet.

3. Packet-switching apparatus comprising
a plurality of inputs for receiving packets,
a plurality of outputs for transmitting packets.
a switching network for transferring packets between selected inputs and selected outputs,
a plurality of input units, each coupled between a respective one of the inputs and the switching network and further comprising
  first means for dividing each packet into a respective plurality of subpackets and
  second means for distributing the associated subpackets together with subpackets of other packets over a period of time longer than that of a single packet according to a predetermined pattern.
a plurality of output units, each coupled between the switching network and a respective one of the outputs and further comprising
  third means for recombining each of the respective plurality of subpackets into a respective packet on the basis of the predetermined pattern and
  and output sorter having a memory and an addressing unit,
wherein
the subpackets are transferred through the switching network separately
under control of the output sorter addressing unit, data is written into and read from the memory in such a manner that the subpackets are recombined into packets on the basis of the predetermined pattern,
the addressing unit includes a register whose contents are transferred as an offset address to the memory, and
the addressing unit repeats the following sequence of operations:
first a subpacket is read from a location in the memory specified by said offset address,
immediately thereafter, a subpacket is written into said location,
the addressing unit then increases the contents of the register by a predetermined step value $S_k$ and, upon exceeding a predetermined maximum offset, reduces the contents by said predetermined maximum offset, and
when the contents equal said predetermined maximum offset, the register is cleared and the current step value $S_k$ is changed to a new step value $S_{k+1}$ calculated from the current step value $S_k$ according to the recursive relation $$S_{k+1} = (n \times S_k) \text{ modulo } (n \times m - 1)$$

where
$S_1 + 1$
n = ratio of the period over which the subpackets of a packet are distributed to the duration of a packet
m = number of subpackets per packet.

4. The packet-switching apparatus of claim 3, wherein
the output sorter addressing unit includes a packet-label detector which detects the beginnings of packets, and
the subpackets are recombined into packets on the basis of the predetermined pattern, starting with the beginnings of packets detected by the packet-label detector.

* * * * *